(12) United States Patent
Schwartz

(10) Patent No.: US 6,891,632 B2
(45) Date of Patent: *May 10, 2005

(54) METHOD AND APPARATUS FOR SELECTING PRINT STRATEGY FOR OPTIMAL PERFORMANCE

(75) Inventor: Stephen Schwartz, Los Angeles, CA (US)

(73) Assignee: Peerless Systems, Inc., El Segundo, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1071 days.

(21) Appl. No.: 09/118,727

(22) Filed: Jul. 17, 1998

(65) Prior Publication Data

US 2001/0043358 A1 Nov. 22, 2001

(51) Int. Cl.[7] .............................................. G06F 15/00
(52) U.S. Cl. ..................................... 358/1.15; 358/1.13
(58) Field of Search .......................... 258/1.1, 1.5, 1.6, 258/1.9, 1.11, 1.14, 501, 524, 401, 443, 448; 345/961, 427, 433; 707/500, 516, 523, 524, 526

(56) References Cited

U.S. PATENT DOCUMENTS

| 5,142,667 A | * | 8/1992 | Dimperio et al. | 358/1.15 |
| 5,333,246 A | * | 7/1994 | Nagasaka | 358/1.16 |
| 5,337,258 A | * | 8/1994 | Dennis | 714/47 |
| 5,502,804 A | * | 3/1996 | Butterfield et al. | 707/502 |
| 5,819,015 A | * | 10/1998 | Martin et al. | 358/1.15 |

* cited by examiner

*Primary Examiner*—Gabriel Garcia
(74) *Attorney, Agent, or Firm*—Blakely Sokoloff Taylor & Zafman

(57) ABSTRACT

A method and system which a) analyzes data to be printed, as well as the capabilities, characteristics, and resources available taking into account initial processing performed on a "host" system, transferring of the data stream to the printer over a communications link, and receiving of the data and performing additional processing as required to deliver the data to a print engine for printing; and b) distributes the processing in an optimal way between the host and the printer so as to best achieve the desired result. By moving processing to the host or to the printer, a page can be processed and printed faster. Further, an entire document can be printed faster by such distribution on a page by page, or selected portions of a page basis.

25 Claims, 5 Drawing Sheets

METHOD AND APPARATUS FOR SELECTING PRINT STRATEGY FOR OPTIMAL PERFORMANCE

FIELD OF THE INVENTION

1. General Purpose of Invention

The purpose of the invention is to analyze the contents of data to be printed on a digital imaging device, such as a laser printer, and determine an optimum processing strategy to print the data. The optimum strategy includes considerations pertaining to printing speed, image quality, and user preferences for the document.

2. Background of the Invention

In general terms, printing a document can be viewed as a process involving three steps:

(1) Initial processing is done on a "host" system. For example, a user might be using an application program such as a word processing program on a PC (the host system) and execute a "print" command. Software in the host system (called the "printer driver") accepts the printing commands issued by the application program and the operating system utilized by the host, and generates a data stream to be sent to the printer.

(2) The data stream is transferred to the printer over a communications link such as a parallel port or a network interface.

(3) The printer receives the data and does additional processing as required to deliver the data to the print engine for printing. The specific requirements may vary from one printing device to another, however for digital imaging devices this generally culminates in the generation of engine-ready "pixel" data, which is given to the print engine to print.

A block diagram showing the major components in a prior art printing process is given in FIG. 1.

The user enters a print command to an application program 11, for example a word processor. The application program uses Application Program Interfaces (APIs) supplied by the operating system 13 to initiate the printing process. The operating system translates these API calls into Device Driver Interface (DDI) calls into the device (printer) driver 15. API and DDI interfaces are intended to be generic interfaces between the application program, the operating system, and the device driver. All knowledge about the specific requirements of a particular printing device, i.e., printer 17 resides within the device driver. It is the device driver which is the primary focus of this invention.

The device driver translates generic DDI calls from the operating system in a device-specific command stream and transmits it to the printer. The command stream contains whatever instructions are required to print the document, according to the capabilities and requirements of the printer. It may include marking functions, indicating where ink needs to be applied to the paper; set-up commands, indicating things such as imaging area and margins, positional information, units of measure and resolution contained in other commands, input and output paper tray, paper size, etc.; job control commands, indicating start and end of a print job, I/O timeout values to use, and other parameters governing the entire print job; and other information as required by the device.

Within this model, several print strategies are commonly used for dividing processing between the host and the printer. They can be generally divided into two categories. In printer-based solutions, there is generally a higher level of intelligence in the printer. The printer driver sends higher level commands to the printer, such as "draw a circle" or "draw a polygon", and the printer processes the commands into engine-ready pixels. The high-level commands are often referred to as a "Page Description Language" (PDL). In host-based solutions, the device driver in the host does more processing, and transmits either (a) device-ready pixels, or (b) an intermediate data form between PDL and pixels.

In prior art printing systems, the division of processing between device (printer) driver and printer is fixed. The device driver is designed to process data up to a certain point, then transmit the processed data to the printer. The printer receives the data, does whatever additional processing is required to prepare the page for the print engine, then passes it to the engine. For any and all pages, the device driver processes to a certain point, and the printer processes from that point until printing.

FIGS. 2(a)–2(c) shows the three common scenarios within a typical prior art printing system. In FIG. 2(a), a high-level PDL generated by device driver 15a is sent to the printer, where it is rasterized and printed. In FIG. 2(b), the marking calls are broken down into an intermediate form between PDL and rasters by device driver 15b. The intermediate form is processed into pixels in the printer. In FIG. 2(c), device-ready rasters are generated in device driver 15c. They are sent to the printer, and printed.

In the scenario shown in FIG. 2(a), existing printers use a variety of both industry-standard PDLs (e.g. PostScript, PCL5E, PCL5C, PCL-XL), as well as proprietary PDLs. They all fall into the category of "intelligent printers", where high-level marking calls are sent to the printer, and the printer renders the page and prints.

The scenarios shown in FIGS. 2(b) and 2(c) are generally referred to as "host-based" printers. The data formats and protocols tend to be customized specifically for the particular printer or other target device. Therefore they tend to be more proprietary, rather than industry standard, although some are more or less similar to or based upon standard page description protocols.

Each of the print models described in FIGS. 2(a)–2(c) is the optimum print model for printing some pages, but is not the optimum model for others. A number of factors determine the optimum model, including:

Page complexity

Resources available in the printer and in the host. This includes processor speed, RAM, and other storage media such as disk space Print engine speed Data transfer rate between printer and host Amount of data to be transferred in each print model User preference (optimize for speed, quality, data size).

Generally, the optimum model for a given document will print with the highest quality in the least amount of time. In some situations, for example when printing over a network and utilizing communications resources which are shared with other people, the user may want to minimize the amount of data to transfer, even if it results in slower print time.

Within a document, the optimum printing strategy may change for different parts of the document, for example from one page to another, or even from one part of a page to another part of the page.

However, prior art printing methods do not have the ability to use different printing models for printing different kinds of data. This has several negative consequences.

It can frequently result in slower printing. Following are two examples.

A very complex document will often generate a very large PDL data stream. Printers that use the model shown in FIG. 2(a) send a very large amount of data to the printer, which may then need to be rasterized by a relatively slow processor (since printer processors are frequently slower than host PC processors). On the other hand, the models shown in FIGS. 2(b) or 2(c) could use the faster host PC processor to break down the high-level marking calls, and then have less data to transfer to the printer.

A simple document, for example pages of text, will generate a small PDL data stream. For printing using the model of FIG. 2(a), the processor in the printer is fast enough to rasterize and print within the minimum time required by the engine to print the page. For example, a 4 pages-per-minute (ppm) print engine requires a minimum of 15 seconds to print each page. Shorter rasterization time will not result in faster printing. On the other hand, printing using the model of FIG. 2(c) will result in a large amount of raster data to transfer from the host to the printer, which will increase the data transfer time, and therefore increase the time required to print the page.

In some cases, the host or printer (more commonly the printer) will not have sufficient resources (for example, RAM) to process and print a complex page at full resolution. When this occurs, a process called "lossy compression" is frequently employed. In this process some data is discarded, and print quality is thereby degraded, in order to print the page. By selecting the model that utilizes available resources most effectively, quality degradation can be avoided.

Ideally, processing should be distributed so as to utilize both printer and host resources in an optimal way. Even if both printer and host are capable of processing and printing with highest quality at maximum engine speed, the preferred model is to use the printer resources as much as possible, in order to free the host resources so they are available to the user for other purposes. Traditional printing methods are not capable of varying the distribution of processing in order to achieve the optimum balance for different documents.

SUMMARY OF THE INVENTION

In order to address the problems which result using prior art techniques, the invention (a) analyzes the data to be printed, as well as the capabilities, characteristics, and resources available in each of the three above-noted steps (i.e, initial processing done on the "host" system (step 1), transferring the data stream to the printer over a communications link (step 2), and receiving the data and performing additional processing as required to deliver the data to the print engine for printing step 3)); and (b) distributes the processing in an optimal way between the host (step #1) and the printer (step #3) so as to best achieve the desired result. In many cases, by moving processing to the host or to the printer, a page can be processed and printed faster. In some cases, higher print quality can be attained by taking advantage of additional resources that are available on one side or the other. In some cases, for example when printing over a network, minimizing the amount of data to transfer may be an important goal. The invention distributes the processing in order to achieve one or more of these goals.

The invention has two significant advances over the prior art:

A single printer driver is capable of printing in any of the printing models shown in FIGS. 2(a)–2(c).

The printer driver is able to analyze data in real time as a page is being printed and auto-detect which is the optimum model.

The printer driver contains algorithms and modules which allow it to output any of the data formats: PDL, intermediate form, or device-ready pixels. This allows it to perform as much processing as necessary in the host, and as much as necessary on the printer.

A printer does not need to support all of the printing models in order to benefit from the invention. There are two reasons for this.

All data formats contain commands to deliver rasters (device-ready pixels). If the driver determines that a page should be rasterized on the host, it can do the entire rasterization and then send it to the printer using existing PDL commands or existing "intermediate form" commands. Therefore any printer that supports either PDL or intermediate form also supports rasters, and can benefit by selection of optimum data format.

The driver is capable of limiting itself to whichever formats the printer accepts. This can be (a) PDL and rasters, (b) intermediate form and rasters, or (c) PDL, intermediate form, and rasters.

The printer driver is capable of switching between formats on a page by page basis. For example if the first page of a document is complex and processing-intensive, and the second page is a simple page of text, the driver can rasterize the first page and send it as device-ready pixels, and send the second page in high-level PDL.

Because all PDLs contain commands to print device-ready rasters, the invention has application and benefit to all printers that support a PDL data stream, regardless of which PDL they support.

Since the driver is capable of generating all data formats, but restricts itself to ones that are supported by the printer, the invention allows the printer driver to modify its behavior as the configuration of the printer is changed. For example, the user can add additional RAM for the printer, allowing more processing to take place in the printer without reduction in speed or quality. Or an additional ROM module can be added to the printer which supports an additional print model, giving the driver additional options in distributing the processing.

The driver provides a user interface that allows the user to specify how the driver should select the print model. As a result, the user can:

have the driver automatically select the optimum model based upon print speed and quality specify a particular criteria for which to optimize (for example, minimize data transfer size)

select a print model to use.

The driver uses two general mechanisms to analyze the data:

Prior to generating the data stream it "pre-scans" the data that is going to be printed. Based on a variety of metrics, it calculates page complexity and resource requirements to print the page.

It examines the output at the conclusion of each stage of printing. Based upon the quantity of data, it can decide to do further processing or send to the printer. For example, if the driver has generated a PDL data stream that is larger than a full-page raster would be, it would probably want to process that to a raster. This would (a) take advantage of the faster host processor, and (b) reduce the amount of data that needs to be send to the printer.

An additional feature of the invention is that it is capable of incorporating the identical modules into the printer driver which execute in the printer. This allows it to generate identical output on the page, dot for dot, regardless of which printing model is used. Traditional printing architectures do not share modules between the host and printer, and therefore will show differences on the printed page, depending on where the processing occurs. The differences can manifest in halftoning, shading, color correction algorithms, edge smoothing, positioning, character rendering, or numerous other minor and major variations. It is not essential to the invention that modules are shared and identical output is generated regardless of what processing takes place where, since some differences may be acceptable, as long as they are both reasonable representations of what is being printed. However the preferred embodiment of the invention includes the ability to seamlessly and transparently move processing between the printer driver and the host without producing any change in the printed output.

DETAILED DESCRIPTION OF THE INVENTION

Figure 1:
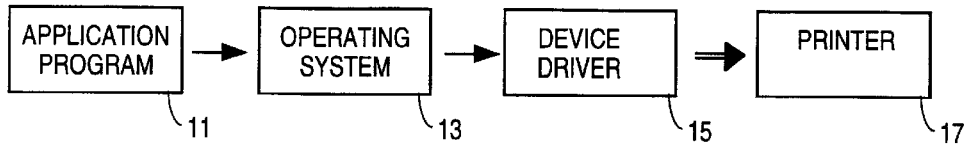
FIG. 1 is a block diagram of the main modules in a prior art printing process.
Figure 2A:
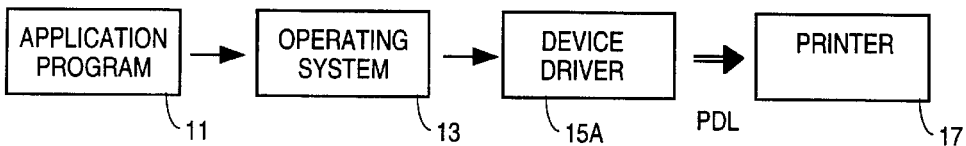
FIGS. 2a–2c are block diagrams showing three common prior art printing scenarios.
Figure 2B:
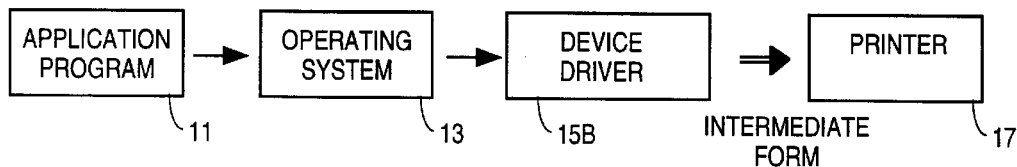
Figure 2C:
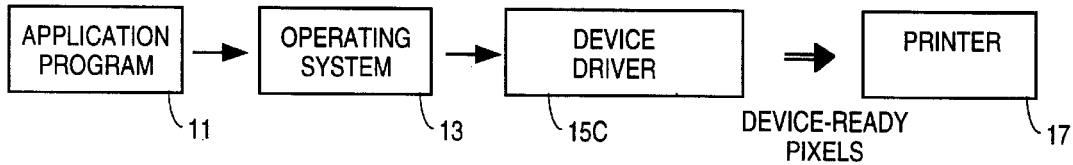

There are three aspects of the operation of the invention:
1. Establishment of selection criteria
2. Data analysis methodologies
3. Driver internal structure and design.

1. Establishment of Selection Criteria

The user is provided an interface to tell the driver how to select a print model. The interface contains several possible selection criteria as follows:

"Automatic" Mode

The user selects this mode to let the driver choose what it thinks is the best printing model. In this case the driver's highest priority in making the selection is print quality. Any resource shortage (typically in the printer) that would result in loss of data and degraded quality causes processing to move to the other side (typically to the host). Note that as long as the printer (or host) contains enough memory to store an uncompressed full-page image in memory, then image degradation is not a possibility.

The driver's second priority is print speed. Using the analysis methodologies described below, the driver chooses the printing model that will make the page print the fastest. The two primary influences on print time are (1) relative processing speed between host and printer, and (2) data transfer time. In general, the processor in the host will be faster than the processor in the printer, so this consideration will typically favor moving more processing to the host. It should be noted that this is not necessarily the case, but it will generally be the case for the class of devices with which the invention is typically used. However, in many cases PDL is the most compact representation of a printed page, and therefore additional processing in the host will increase the data that needs to be transferred, and therefore reduce print speed. Therefore the driver needs to weigh these considerations and make as good an estimate as possible as to the printing time required for the various print models.

If print quality and speed are equal under different models, then the driver will favor moving as much processing as possible to the printer. A page cannot print any faster than print engine speed, so many pages will not print faster even by using the faster processor and additional RAM on the host. The user has many uses for the host processor other than printing (executing other applications, such as word processing, etc.) but printer resources have no use other than printing. Therefore, all else being equal, processing is moved to the printer.

Optimize for Data Size Mode

One particular scenario that users may select is to minimize the amount of data that will be transferred from host to printer. In network printing this is often an important consideration. This option will choose the data format to optimize for this condition, even though it may result in slower printing or lowered print quality (not likely but possible).

In some implementations, optimizing for data size might be given a higher priority in "Auto" selection mode, depending on the primary intended use of the printing device. For printers which are primarily intended as shared network devices, minimizing network traffic is often given a higher priority than for non-networked devices.

Explicit Selection of a Print Model Mode

The user is given the option of explicitly selecting one of the print models. This could be useful for various reasons, for example: (i) the driver's predictions will never be 100% accurate, so the user is given the opportunity to substitute his own selection, or (ii) the user might want to use the driver with a printing device other than the one for which the driver was designed, which only accepts a particular data format.

In principle the user could be allowed to select for other optimization criteria (for example, make speed the primary consideration).

2. Data Analysis Methodologies

A large number of factors can theoretically influence the print time, resource requirements, and print quality for a particular page or document. These include:

Relative processor speed on host and printer.

Available RAM on host and processor. When RAM is used up various events occur (swapping to disk, data compression) which reduce performance and ultimately, in some cases, quality.

Complexity of data to be printed.

Data transfer rate between printer and host.

Amount of data to transfer.

Maximum print engine speed.

Additional processing load on host (from other applications).

The large number of variables, the complexity of some of these factors, and the indeterminacy of others (precise data transfer rate, extraneous processing load on the host) make exact predictions for the various print models impossible. The invention uses two general mechanisms, namely, (i) pre-scanning the data and (ii) examination of data size generated at each stage to evaluate the data and choose the print model.

(i) Pre-scanning the Data

Before beginning to generate the data stream, the driver scans all of the calls being made by the application program. The driver then applies metrics and algorithms (described below) to estimate (a) the processing required to convert PDL to intermediate form, and intermediate form to rasters; and (b) the amount of data that will result at each stage of processing (PDL, intermediate form, rasters). If the amount of data at any stage exceeds the available storage on one side or the other (printer or host), then that particular printing scenario would result in having to "lossy compress" the page (i.e. discard data), and therefore degrade print quality. Typically print quality is given the highest priority in selecting the print model, so that printing scenario would be assigned a low priority.

Based on processing speed and resources available in the host and in the printer, as well as data transfer rate, the driver estimates print time in each of the printing scenarios. The scenario that results in the shortest print time is given the highest priority.

Several methods are used to arrive at expected data transfer rate. They include a combination of (a) observed rates during actual data transfers; (b) parameters entered by the user; (c) "default" estimated transfer rates for different types of communications links.

In the preferred embodiment, the driver uses built-in features of the interface between the operating system and the printer driver to pre-scan the data. It uses a "two-pass" print model for each page. In the first pass, the driver requests all of the marking calls for a page from the operating system. The driver records information about the calls, but does not generate any data stream. At the conclusion of the first pass the driver performs analysis on the gathered information, and makes a decision about the optimum model. It then requests the data again in a second pass, and generates the data stream according to the selected print model.

An alternate implementation would be for the driver to record the calls issued by the operating system to a "spool file" or data base, then perform analysis and generate the data stream from the recorded spool file.

Different metrics and algorithms are used for different kinds of marking calls. There are essentially three different kinds of objects which are drawn: bitmaps, graphics, and text.

Bitmaps

A bitmap is a bit image that needs to be replicated on the target device. The primary determinants for the amount of processing required by a bitmap involve:

Scaling—this means changing the pixel dimensions of a bitmap, for example, taking a 100×100 bitmap and printing it at 256×256.

Halftoning—this means representing the colors present in the input bitmap in the colors available on the output device. For example, if the output device is a monochrome printer, colors are translated to shades of gray. Several different halftoning algorithms can be used (for example (a) screening, or (b) error diffusion) which result in different halftone appearances and require different amounts of processing.

Color correction—this means adjusting color values to reproduce the appearance of a document as accurately as possible, according to visual and display characteristics of the input and output devices. This concerns factors other than halftoning, such as displayable color range ("gamut"), additive vs. subtractive color devices, ink or illuminant characteristics, etc.

Data size—depending on size and color format, bitmaps can contain a very large amount of data, which consumes both processing time and transfer time. The algorithm considers both source (input) data size and destination (output) data size, when the bitmap needs to be scaled.

Details about how these functions are carried out are not needed for an understanding of the present invention. The invention only requires an estimate of the processing and resource requirements imposed by each of these factors.

Graphics

A graphics call is an operation to draw a shape, such as a circle or a polygon. Graphics calls are generally short, compact instructions. Important considerations for graphics calls relative to the invention include:

Number of calls—programs which use graphics sometimes have an enormous number of drawing commands, resulting in a large amount of processing and a large amount of data to represent the commands.

Area affected by call—a graphics call can cover a small or large area. Processing required is proportionate to number of pixels affected by the call.

Computational complexity—some calls, for example rectangles, are straightforward and require relatively little calculation. Other calls, for example multi-sided polygons, require extensive calculation.

Text

Computations performed for text include the following:

Number of different fonts—each character of each font which is used needs to be rasterized, which is computationally expensive.

Size of downloaded fonts—downloaded fonts (i.e., fonts generated by the driver or the operating system and sent to the printer) increase the amount of data that needs to be sent, and therefore transfer time required.

For each of the three kinds of drawing calls, the driver makes calculations about the processing requirements and data sizes and selects print model based on these calculations.

(ii) Examination of Data Size Generated at Each Stage

The first mechanism (pre-scanning) attempts to predict the processing requirements for what will follow. The second mechanism looks at the output at each of the first two stages (PDL, intermediate form) and makes a decision based on size of the data. For example, if (a) the size of PDL output is larger than it would be to send a fully rasterized page image, and (b) there is a faster processor and more RAM in the host than in the printer, then the driver would choose to rasterize in the host. This would reduce print time in two ways: (1) it would reduce the amount of data to be transferred, and (2) it would utilize the faster host processor, rather than the slower printer processor, to do the rasterization.

The driver can incrementally generate and process the data through each of the three processing stages (PDL, intermediate form, rasters). This implementation, including data transformations and decision points, is illustrated in FIG. 3.

Figure 3:
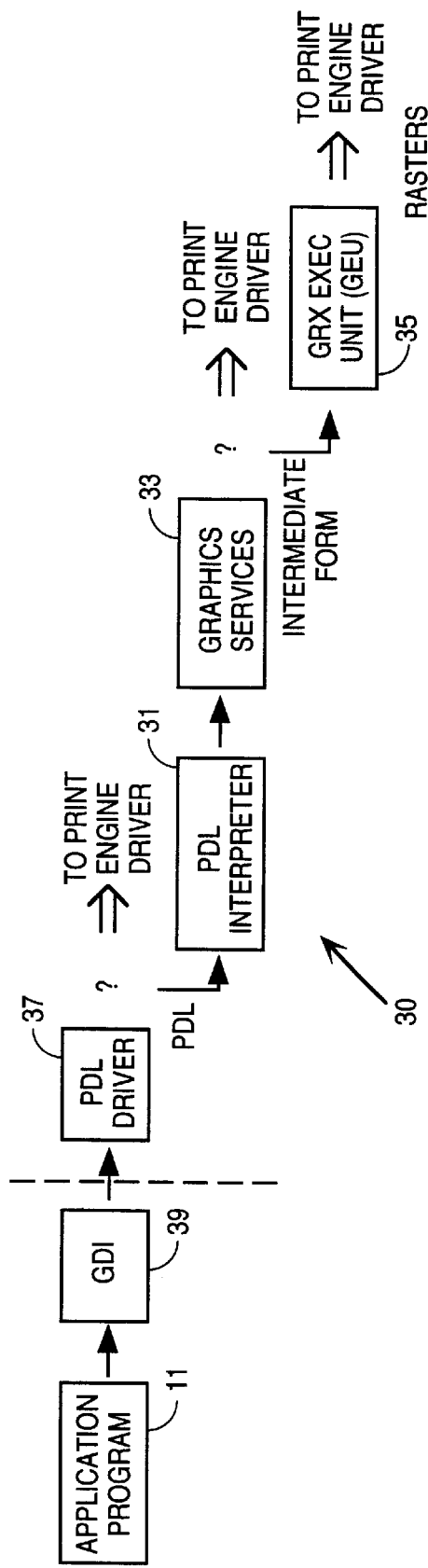
FIG. 3 is a block diagram of the main modules in a printing process according to the present invention.

In this FIG. 3, the PDL Interpreter 31 is responsible for parsing the PDL input and making appropriate calls to a Graphics Services module 33. The Graphics Services module processes the data into an intermediate form. A Graphics Execution Unit module 35 processes the intermediate form into engine-ready rasters. The PDL input is provided by PDL driver 37 which generates PDL commands based on output from Graphics Device Interface (GDI) 39 which in turn receives data to be printed requested by application program 11.

This contrasts with another possible implementation, where the print model is selected and immediately generated in that form. That implementation would need to rely exclusively on a priori knowledge about the data stream, without benefit of ex post facto analysis.

Both of these analysis methodologies (pre-scanning and data size analysis) are utilized on a page by page basis. This allows the driver to switch print models for each page, according to the data on the page and the optimal printing strategy for that page. Alternate implementations could allow different strategies to be used for different parts of each page. The page could be broken down into pre-defined rectangular areas (called "bands"), or discrete objects on the page.

Following is a description of the algorithm used by the driver to decide which printing strategy to use.

1. Performance

With respect to performance, the overall strategy is to calculate the printing time required in each of the three models and select the model that results in the fastest printing.

The first decision is whether the driver should send PDL to the printer or should process the PDL to intermediate form before sending. In both of these imaging models, printing time will be the sum of the following:

1. Processing time required to convert PDL to intermediate form
2. Transmission time to send data from the host to the printer.

Each of these will be different in the two imaging models.

A "page complexity index" is calculated, estimating the magnitude of processing required for the data on the page. The estimate takes into consideration (a) the amount of raw data that needs to be processed (irrespective of complexity), and (b) specific events that have been identified through analysis that induce a particularly heavy processing requirement. The "page complexity index" is a computed by adding the following factors.

A. Raw data size
B. Amount of bitmap data needing to be scaled
C. Amount of bitmap data needing to be halftoned.
D. Amount of bitmap data requiring color correction
E. Number of graphics drawing commands
F. Number of pixels touched by the graphics calls
G. Number of continuous (scan)line segments created by bitmap and graphics calls
H. Computational complexity of graphics calls
I. Number of characters requiring rasterization
J. Size of characters requiring rasterization All of these are normalized according to predetermined scales and metrics in order to generate the complexity index. For (C) (halftoning), different weighting factors are used for different halftone types. The predetermined scales and metrics needed to perform such normalization would be determined based upon the specifics of the hardware used to implement the host and the printer. In general, for each of the items A–J, a threshold is selected based on experience with the particular printer/host combination or printer/host combination with similar characteristics. If a page exceeds the threshold on any one of the A–J items then processing will be done on the host. Once a table of pre-determined thresholds for a known PC/printer configuration is obtained (that is, a test configuration), such thresholds may be adjusted up or down based on the particular PC/printer configuration that the user is running. So, for example, if the test system is a 100 mhz PC/50 MHz printer, and the user is running a 200 mhz PC/50 MHz printer, then the thresholds get cut in half. It has been determined that factor A (raw data size), gives the correct prediction about 95% of the time in a particular configuration. It is anticipated that as to the 5% of files for which the prediction was not correct, it is likely that they all are complex according to at least one of the B–J metrics.

Thus, to summarize, a calculation is made of processing time required on both host and printer. The calculation is made based on the processing speed of the host processor (detected in real-time by the driver) and the processing speed of the printer. The processing speed of the printer is built into the driver if the driver is intended for a single printer. If the driver is intended to control more than one kind of printer, processing speed might be communicated to the driver using the bi-directional communications channel, or set by the user through a configuration parameter.

The next calculation is transmission time required to send the data stream from the host to the printer. This is calculated for each printing model from the data size and data transfer rate. PDL data size is known. Intermediate form data size is estimated based on observed relationships between the size of PDL and the size of intermediate form. Full-page raster data size is estimated based on the observed size of a compressed full-page raster.

Data transmission rate is estimated based on one of the following:

A) Estimated transfer rate for the class of I/O device
B) Transfer rate observed in real-time by the driver on previous print jobs
C) A user-selected setting.

Based upon these factors, total printing time can be estimated for each of the three models. Note that:

1. The driver would not necessarily choose the model that results in the shortest print time. Regardless of page complexity (or lack thereof), no page can print faster than the rated speed of the engine. Therefore if a page can print at maximum speed by processing in the printer then this path is taken, even if it would be processed faster on the host. This makes best use of printer resources, which are not useful for any other purpose, and frees host resources for other tasks when possible.

2. These calculations result in estimates of printing time in each model, not precise calculations. Fortunately, this is sufficient. They will tend to make the most correct predictions in cases where one model or another will print significantly better than the others will. For example very complex pages will have a great deal of data to be processed, which will trigger the correct choice, and very simple pages will have little data, also triggering the correct choice. The difficult predictions will be in the cases where the printing models result in the most similar results, which are the least important to predict accurately. In addition, it is possible to select crossover points that favor the more "conservative" printing strategy, where "conservative" means the strategy used by competing printers in the same class. For example, if a printer is competing against other PDL-based printers, then the decision points can be weighted to choose PDL in ambiguous cases, so that it will not do worse than competing printers in these cases. It may be preferable to sacrifice performance gains in some cases in order to retain competitive performance in others.

The second decision is whether intermediate form should be sent to the printer or processed to rasters before sending. This is a simpler decision than the PDL/intermediate form choice. It turns out that the time required to render from intermediate form to rasters does not effect the printing time. This is because when rendering is performed on the host, the page can almost always be rendered faster than the data can be sent. Therefore the rendering time does not increase total printing time. When rendering is performed on the printer it is not a factor because the intermediate form is rendered in real-time as the page prints by a graphics co-processor, and therefore again does not gate printing speed.

Therefore, the choice between sending intermediate form and rasters is based on the amount of data that needs to be sent in each case, which determines the data transmission time. Less data to send results in faster transmission, and quicker printing. Data size of intermediate form is evaluated twice. First, it is estimated before the conversion from PDL to intermediate form, based on observed relationships between the size of PDL and the size of intermediate form. Second, if the first decision is to convert PDL to intermediate form, then the data size of intermediate form is examined after this has been completed. Data size of the rendered page is estimated based on the observed average size of a compressed full-page raster. These data sizes feed into the calculations for printing time under each of three printing models, which dictate the choice of the optimal printing strategy.

2. Quality

The data analysis also considers cases where print quality might be better when printing in one model or another. This will occur when the translation from PDL to intermediate form requires more memory than is available on one side or the other. Typically the host will have more memory than the printer, so this applies primarily to low printer resources. This is determined based on the factors listed above in the "page complexity index" calculation, and one additional consideration, which is the amount of memory work space required by the software. When the total memory requirement exceeds available memory on the printer, and print quality is a high priority in selecting print model, then one of the more host-based printing models is selected.

The disclosed embodiments of the invention select optimum print strategy for every page. Alternatively it could select a different strategy for different parts of each page. Or it could select a strategy for the document as a whole.

Alterations could be made in the definition or selection of criteria for "optimal strategy". In "automatic" mode the criteria could be prioritized differently. Or different selection criteria could be presented to the user.

Improvements and refinements could be made in the algorithms used to select optimum printing strategy.

The invention could be built without containing the entire imaging pipeline on the host. Although the preferred embodiment of the invention processes the data to PDL, then to intermediate form, then to rasters, as described previously, alternatively, the invention could be implemented so as to determine the best format in the pre-scan and generate that format directly.

The preferred embodiment of the invention uses the built-in pre-scanning mechanism in the interface between the printer driver and the operating system. In another alternate embodiment, the invention could be implemented to build its own spool file or data base of the drawing calls that are made, and do analysis on these.

3. Driver Internal Structure and Design

FIG. 3 shows major modules of the device driver 30. PDL driver 37, which is the main focus of the present invention, has three primary responsibilities that are relevant to the invention:
(1) It pre-scans the data and makes the initial determination about optimal data format.
(2) It generates the PDL data stream.
(3) Based on the outcome of the data analysis methodologies described above, it either sends the PDL data stream to the printer, or passes it along for the next stage of processing.

The PDL driver is implemented as a collection of C++ objects. This includes the following object classes that are relevant to the invention:

cPrinterLanguage class—This encapsulates and abstracts details about which PDL is being generated. Encapsulation of this into an object class allows the invention to work with any PDL which the driver is capable of generating and the printer is capable of receiving.

cOutputDest class—This encapsulates and abstracts details about where the data stream will be sent: either to an I/O port for transmission to the printer, or to the PDL interpreter on the host for additional processing.

cPreScan class—This encapsulates and abstracts the process of pre-scanning data and making the selection of optimum printing strategy.

Figure 4:
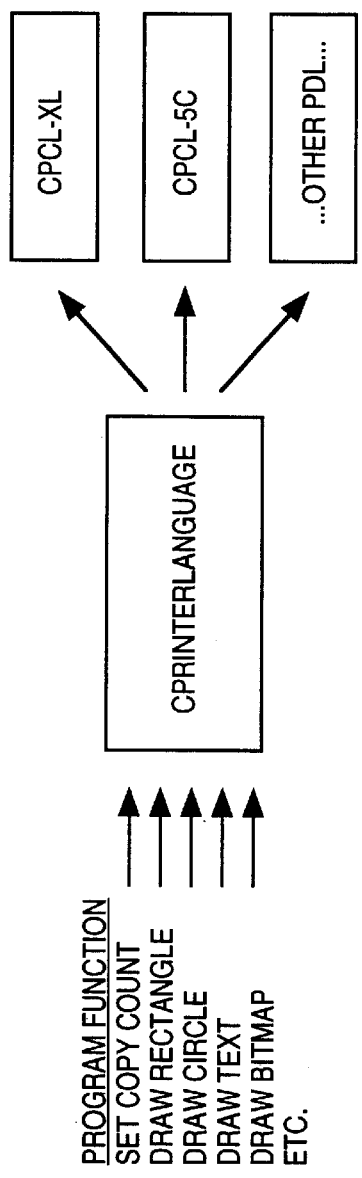
FIG. 4 is a diagram showing the relationship of a cPrinterLanguage class to driver code.

FIG. 4 is a diagram showing the relationship of the cPrinterLanguage class to the rest of code utilized by the driver. A partial list of the methods used by this class is as follows:

cPrinterLanguage::SendJobPreamble( )
cPrinterLanguage::SendPageEject( )
cPrinterLanguage::SendPaperSize( )
cPrinterLanguage::SendPaperSource( )
cPrinterLanguage::SendSetCopies( )
cPrinterLanguage::SendSetCursorPosnXRel( )
cPrinterLanguage::SendSetCursorPosnYRel( )
cPrinterLanguage::SendSelectFont( )
cPrinterLanguage::DrawBitmap( )
cPrinterLanguage::DrawSolidRectangle( )
etc.

Figure 5:
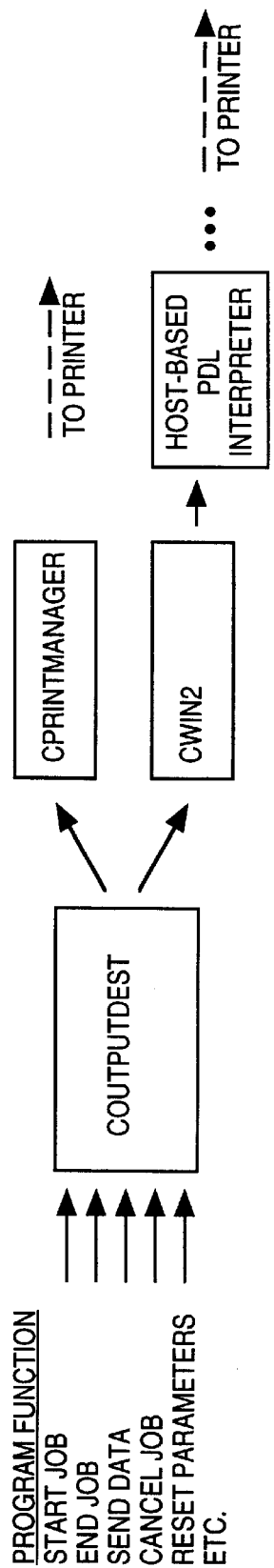
FIG. 5 is a diagram showing the relationship of a cOutputDest class to driver code.

FIG. 5 is a diagram showing the relationship of the cOutputDest class to the rest of code utilized by the driver. The cWin2 class sends data to the other modules running on the host where additional processing is done before sending it to the printer. A partial list of the methods used by this class is as follows:

cOutputDest::StartJob( )
cOutputDest::CloseJob( )
cOutputDest::DeleteJob( )
cOutputDest::WriteSpool( )
cOutputDest::ResetDevice( )
etc.

Figure 6:
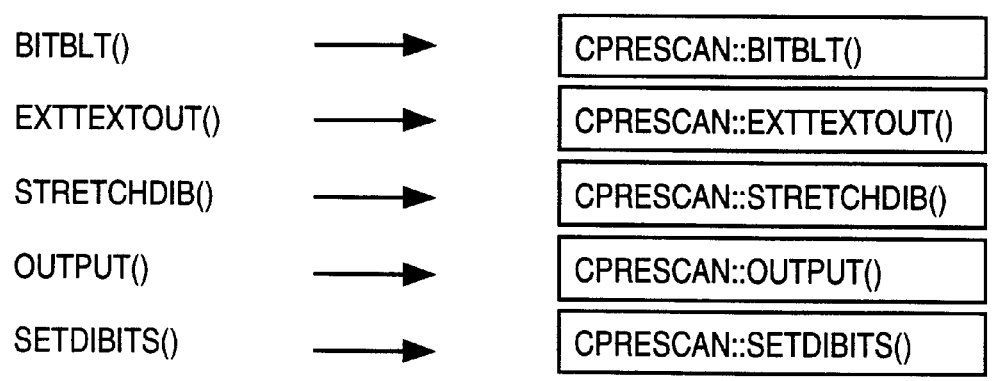
FIG. 6 is a diagram showing the relationship of a cPreScan class to driver code.

FIG. 6 is a diagram showing the relationship of the cPreScan class to the rest of code utilized by the driver. A partial list of the methods used by this class is as follows:

cPreScan::BitBlt( )
cPreScan::ExtTextOut( )
cPreScan::StretchDIB( )
cPreScan::Output( )
cPreScan::SetDIBits( )

PDL Interpreter 31, Graphics Services Module 33, Graphics Execution Unit 35

Figure 7A:
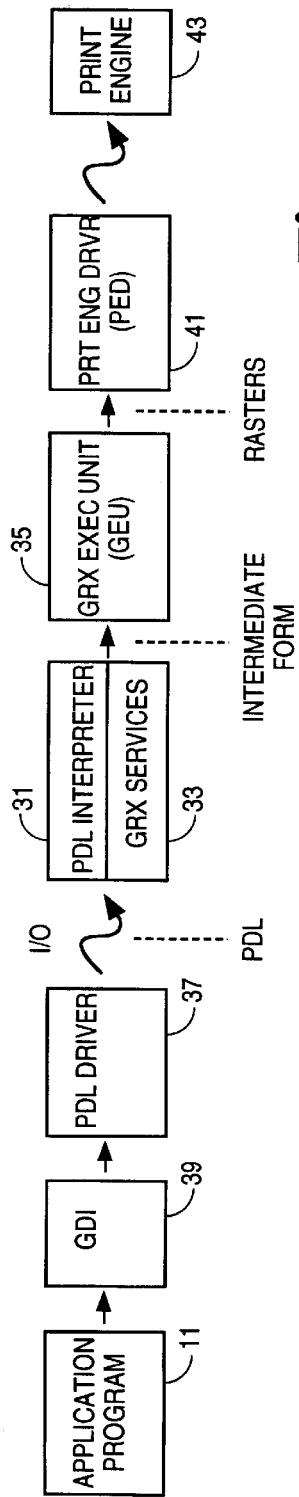
FIGS. 7a–7c are block diagrams showing three printing scenarios according to the present invention.
Figure 7B:
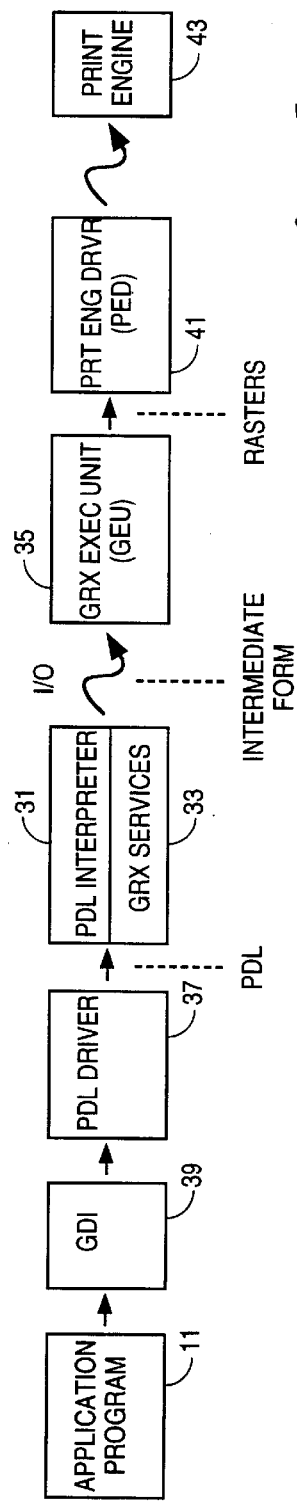
Figure 7C:
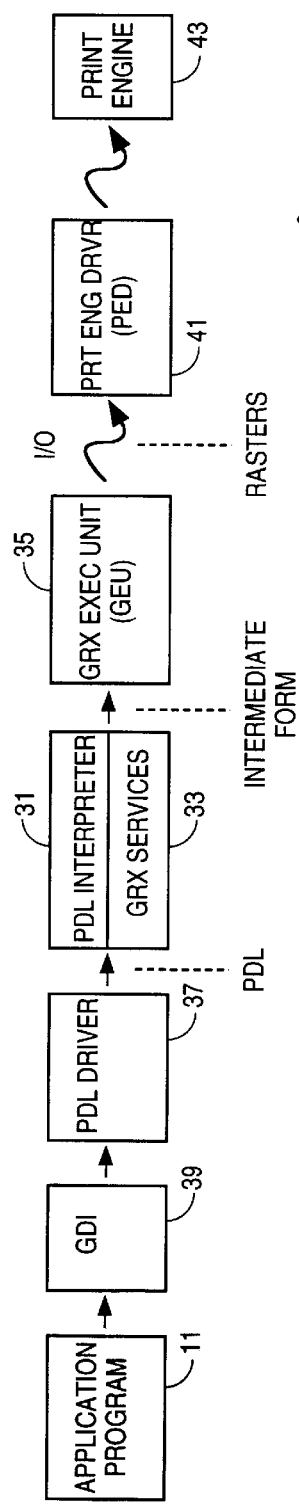

These modules essentially replicate and make available in the host the entire printing pipeline that occurs in the printer in printer-based printing models. This is illustrated in FIGS. 7a–7c in which the various modules having the same reference numbers perform the same functions as the correspondingly numbered modules in FIG. 3. The replication is obtained by having one version of the software modules being built to run on the host, and having another version which is built to run on the printer. The host version is installed along with the printer driver. The printer version is installed into the printer (that is, in the printer ROM). So the modules are available in both places. Print engine driver 41 and print engine 43 are part of a printer such as printer 17 shown in FIG. 1 and are known in the prior art and do not form part of the present invention. The main difference between the models shown in FIGS. 7a–7c is that in FIG. 7a, PDL is sent to the printer. The PDL interpreter and graphics services modules on the printer process it to intermediate form, then to rasters. In FIG. 7b, PDL is sent to the PDL interpreter and graphics services on the host. The host modules process it to intermediate form, then send this to the printer, where it is processed to rasters. In FIG. 7c, the host modules process the data all the way to rasters before being sent to the printer.

PDL Interpreter 31—This module reads and parses the PDL data stream and makes appropriate calls into the Graphics Services module.

Graphics Services 33—This module generates an intermediate form of data called on "order list" which can be easily processed by the Graphics Execution Unit to produce rasters.

Graphics Execution Unit 35—This module takes as input the intermediate "order list" and outputs rasters. It can be a software module or a hardware device specifically designed for this purpose.

The internal structure and operation of these modules is not needed for an understanding of the present invention. Elements of these modules are described in detail in U.S. Pat. No. 5,502,804.

By use of the present invention, the following advantages over the prior art are obtained:

1. Many pages are printed faster than they would have without the invention by choosing the optimum printing strategy for each page.
2. Some pages print with higher quality than they otherwise would have, by utilizing resources on both the host and printer, and therefore avoiding having to do "lossy compression", which loses data and degrades quality.
3. The amount of data that needs to be transferred to print a page is minimized, reducing the load on shared communications links such as networks.
4. Virtually any printer that supports an "intelligent" PDL or data format, where an intelligent PDL or data format is defined as one that supports something other than rasters, benefits. This is because all PDLs and printer data formats support rasters in addition to the other higher level commands.
5. The ability to make a real-time, dynamic decision about the optimal printing strategy based on the data to be printed.
6. Embodied in a single printer driver that can output in a variety of data formats and representations.
7. The ability to print different pages, or even different parts of a page, using different printing strategies.
8. User-selectable criteria to guide the printer-driver in making the selection of printing model.
9. Maximum advantage is taken of resources available in both the host and the printer by optimally distributing the processing requirements.
10. Automatic adjustments to changes in hardware configuration, such as the addition of memory to the printer, and confers the other benefits described, without requiring a new printer driver.

Although the foregoing description provides specific examples and methodologies, such specifics should not be construed as limiting the scope of the invention as defined in the following claims.

I claim:

1. A method for processing an input data stream for printing on a printer, comprising the steps of:

scanning said input data stream to identify calls being made within a band of said input data stream;

analyzing said calls being made within said band to estimate (a) an amount of processing required to convert Page Description Language (PDL) data format to intermediate form data format, and intermediate form data format to device-ready pixels data format, and (b) an amount of data associated with said PDL data format, said intermediate form data format and said device-ready pixels data format;

selecting a data format based on said analysis; and generating an output data stream according to the selected data format.

2. The method of claim 1, wherein the amount of processing required is estimated based on a combination of at least two of the following factors: raw data size, amount of bitmap data needing to be scaled, amount of bitmap data needing to be halftoned, amount of bitmap data requiring color correction, number of graphics drawing commands, number of pixels touched by the graphics calls, number of continuous line segments created by bitmap and graphics calls, computational complexity of graphics calls, number of characters requiring rasterization, and size of characters requiring rasterization.

3. The method of claim 1, wherein the data format is selected based on a print model.

4. The method of claim 3, wherein the print model is configured to minimize the amount of data transferred from a host system to the printer.

5. The method of claim 3, wherein the print model is configured to minimize print time.

6. The method of claim 3, wherein the print model is configured to maximize print quality.

7. The method of claim 1, wherein said scanning of the input data stream to identify calls made within the band is accomplished prior to conversion of said input data stream into PDL data format.

8. A system for processing an input data stream for printing on a printer, comprising:

a page description language (PDL) driver to (1) generate a page description language (PDL) data stream from said input data stream, (2) compute a first resource requirement to print said PDL data stream and (3) based on said first resource requirement, selectively output said PDL data stream to one of (i) said printer and (ii) a graphics services module coupled to said PDL driver;

said graphics services module to (1) process said PDL data stream received from said PDL driver into an intermediate form data stream, (2) compute a second resource requirement to print said intermediate form data stream and (3) based on said second resource requirement, selectively output said intermediate form data stream to one of (I) said printer and (ii) a graphics execution unit module coupled to said graphics services module; and said graphics execution unit module to (1) process said intermediate form data stream to a device-ready pixels data stream and (2) output said device-ready pixels data stream to said printer.

9. The system of claim 8, wherein said first and second resource requirements correspond to the amount of data that needs to be sent to the printer.

10. The system of claim 8, wherein said first and second resource requirements correspond to the amount of processing required to convert from one data stream format to another data stream format.

11. The system of claim 10, wherein the amount of processing required is estimated based on a combination of at least two of the following factors: raw data size, amount of bitmap data needing to be scaled, amount of bitmap data needing to be halftoned, amount of bitmap data requiring color correction, number of graphics drawing commands, number of pixels touched by the graphics calls, number of continuous line segments created by bitmap and graphics calls, computational complexity of graphics calls, number of characters requiring rasterization, and size of characters requiring rasterization.

12. The system of claim 8, wherein the format of a data stream is selected based on a print model.

13. The system of claim 12, wherein the print model is configured to minimize the amount of data transferred from a host system to the printer.

14. The system of claim 12, wherein the print model is configured to minimize print time.

15. The system of claim 12, wherein the print model is configured to maximize print quality.

16. A system for processing an input data stream for printing on a printer, comprising:

means for scanning said input data stream to identify calls being made within a band of said input data stream;

means for analyzing said calls being made within said band to estimate (a) an amount of processing required to convert Page Description Language (PDL) data format to intermediate form data format, and intermediate form data format to device-ready pixels data format, and (b) an amount of data associated with said PDL data format, said intermediate form data format and said device-ready pixels data format;

means for selecting a data format based on said analysis; and means for generating an output data stream according to the selected data format.

17. The system of claim 16, wherein the amount of processing required is estimated based on a combination of at least two of the following factors: raw data size, amount of bitmap data needing to be scaled, amount of bitmap data needing to be halftoned, amount of bitmap data requiring color correction, number of graphics drawing commands, number of pixels touched by the graphics calls, number of continuous line segments created by bitmap and graphics calls, computational complexity of graphics calls, number of characters requiring rasterization, and size of characters requiring rasterization.

18. The system of claim 16, wherein the format of a data stream is selected based on a print model.

19. The system of claim 18, wherein the print model is configured to minimize the amount of data transferred from a host system to the printer.

20. The system of claim 18, wherein the print model is configured to minimize print time.

21. The system of claim 18, wherein the print model is configured to maximize print quality.

22. An apparatus comprising a machine readable medium containing instructions which, when executed by a machine, cause the machine to perform operations comprising:

analyzing print commands received from an application based on resources of a host system which performs initial processing of the print commands;

selecting a data format based on the analysis of the print commands;

generating a data stream in accordance with the selected data format;

outputting the data stream to a printing device, wherein the data format of the output data stream is selected from the following data formats: Page Description Language (PDL), intermediate form and device-ready pixels; and wherein the analyzing of the print commands further comprises estimating the amount of processing time required to convert (a) from the PDL data format to the intermediate form data format and (b) from the intermediate form data format to the device-ready pixels data format.

23. The apparatus of claim 22, wherein the amount of processing time is estimated based at least in part on raw data size, amount of bitmap data needing to be scaled, amount of bitmap data needing to be halftoned, and amount of bitmap data requiring color correction.

24. The apparatus of claim 22, wherein the amount of processing time is estimated based at least in part on number of graphics drawing commands, number of pixels touched by the graphics calls, number of continuous line segments created by bitmap and graphics calls, and computational complexity of graphics calls.

25. The apparatus of claim 22, wherein the amount of processing time is estimated based at least in part on number of characters requiring rasterization, and size of characters requiring rasterization.

* * * * *